US012790041B1

(12) United States Patent
Lin

(10) Patent No.: US 12,790,041 B1
(45) Date of Patent: Nov. 10, 2026

(54) ENGINE POWERED CONTROL SYSTEM APPLIED TO UNMANNED VEHICLES

(71) Applicant: Hao-Ping Lin, New Taipei City (TW)

(72) Inventor: Hao-Ping Lin, New Taipei City (TW)

( * ) Notice: Subject to any disclaimer, the term of this patent is extended or adjusted under 35 U.S.C. 154(b) by 0 days.

(21) Appl. No.: 19/365,645

(22) Filed: Oct. 22, 2025

(51) Int. Cl.
*B64U 50/11* (2023.01)
*B64U 50/13* (2023.01)
*B64U 50/23* (2023.01)
*B64U 50/30* (2023.01)

(52) U.S. Cl.
CPC .............. *B64U 50/11* (2023.01); *B64U 50/13* (2023.01); *B64U 50/23* (2023.01); *B64U 50/30* (2023.01)

(58) Field of Classification Search
CPC ........ B64U 50/11; B64U 50/13; B64U 50/23; B64U 50/30; B60T 8/172; B60W 10/08
See application file for complete search history.

(56) References Cited

U.S. PATENT DOCUMENTS

| | | | | |
|---|---|---|---|---|
| 5,734,912 | A * | 3/1998 | Okuno | G11B 19/00 |
| 7,575,192 | B1 * | 8/2009 | Kish | B64C 27/12 244/60 |
| 8,042,634 | B2 * | 10/2011 | Eritate | B60L 50/16 475/5 |
| 8,447,487 | B2 * | 5/2013 | Nishino | B60T 8/885 701/78 |
| 8,506,020 | B2 * | 8/2013 | Nishino | B60T 13/745 303/122.04 |
| 9,278,676 | B2 * | 3/2016 | Nishino | B60T 8/321 |
| 10,340,106 | B2 * | 7/2019 | Kato | H03K 17/567 |
| 10,597,015 | B2 * | 3/2020 | Mizusaki | H02J 7/342 |
| 11,332,106 | B2 * | 5/2022 | Mizusaki | B60T 13/686 |
| 11,938,825 | B2 * | 3/2024 | Sukhatankar | B60K 25/06 |
| 12,472,918 | B2 * | 11/2025 | Tarandek | B60T 13/741 |
| 12,654,566 | B2 * | 6/2026 | Miura | B60L 15/2045 |
| 12,654,670 | B2 * | 6/2026 | Baig | B60W 10/08 |
| 12,654,852 | B2 * | 6/2026 | Park | B64C 39/024 |
| 12,654,886 | B2 * | 6/2026 | Foster | B64U 10/13 |
| 2003/0193404 | A1 * | 10/2003 | Joao | B64D 45/0015 340/426.13 |
| 2005/0153812 | A1 * | 7/2005 | Box | B64D 35/00 475/257 |

(Continued)

*Primary Examiner* — Medhat Badawi
(74) *Attorney, Agent, or Firm* — MUNCY, GEISSLER, OLDS & LOWE, P.C.

(57) ABSTRACT

An engine powered control system applied to unmanned vehicles, including an engine module, a starter motor, a power output module, and a control module, wherein the engine module is provided with a power output terminal. The starter motor is configured to the power output terminal and is further provided with a sensor, containing information on the rotor position. Accordingly, bidirectional rotation and position sensing capabilities of the starter motor is in conjunction with the control module to carry out "first reverse, then forward" enable logic, to release compression resistance of an internal combustion engine crankshaft and improve start-up efficiency. After starting the engine module it is switched to power generation mode, and stable power generated is output to a flight control system or to a power supply system of the vehicle, thereby providing excellent system integration in small size, and improving the endurance range and the efficiency thereof.

8 Claims, 5 Drawing Sheets

(56) References Cited

U.S. PATENT DOCUMENTS

2005/0178892 A1* 8/2005 Box ........................ B64C 27/14
244/60
2005/0269870 A1* 12/2005 Ohashi .................. B60R 16/023
303/20
2009/0242287 A1* 10/2009 Eritate ................... B60W 10/11
180/65.21
2009/0243530 A1* 10/2009 Lin ........................ A63H 19/24
318/504
2010/0219779 A1* 9/2010 Bradbrook ................ F02C 7/32
60/773
2011/0215268 A1* 9/2011 Minervini ............... F01D 15/00
251/129.01
2011/0266106 A1* 11/2011 Suzuki ...................... B60T 8/96
188/360
2011/0315806 A1* 12/2011 Piasecki .................... B60F 5/02
244/17.11
2012/0159207 A1* 6/2012 Chao ..................... G06F 1/3275
713/310
2013/0082514 A1* 4/2013 Murakami ............ B60T 13/686
303/14
2015/0184362 A1* 7/2015 Komiyama ........... E02F 9/2095
414/744.2
2017/0036659 A1* 2/2017 Murakami ............ B60T 13/686
2017/0073065 A1* 3/2017 Von Novak ............. B64C 19/00
2017/0253233 A1* 9/2017 Masuda ................... B60K 6/26
2018/0118364 A1* 5/2018 Golshany ............. B64D 27/026
2019/0061727 A1* 2/2019 Mizusaki ................ B60T 8/172
2020/0206936 A1* 7/2020 Xiong .................... B25J 9/1692
2021/0245732 A1* 8/2021 Nahidi ................... B60K 17/22
2021/0394896 A1* 12/2021 Kuang .................... B64C 27/82
2022/0081952 A1* 3/2022 Fujita ...................... E05F 15/41
2022/0105793 A1* 4/2022 Sukhatankar .......... B60K 25/06
2022/0127999 A1* 4/2022 Ross ..................... F01B 11/004
2022/0266815 A1* 8/2022 Crisp ....................... B60K 6/26
2022/0364488 A1* 11/2022 Stoltz ........................ B60L 1/02
2023/0176550 A1* 6/2023 Cella ................ G05B 19/41885
700/117
2023/0176557 A1* 6/2023 Cella ................ G05B 19/41885
700/117
2023/0179126 A1* 6/2023 Reynolds .................. H02P 1/26
318/400.04
2023/0195058 A1* 6/2023 Cella ................ G05B 19/41885
700/43
2023/0278713 A1* 9/2023 Tsutsumi ............... B64D 27/10
244/60
2024/0034479 A1* 2/2024 Detweiler ................ B60K 6/44
2024/0067154 A1* 2/2024 Kim ...................... B60W 10/06
2024/0113513 A1* 4/2024 Syed ......................... F02C 9/48
2024/0359679 A1* 10/2024 Pilz ..................... B60L 15/2045
2025/0043719 A1* 2/2025 Sibbach .................. F02C 6/206
2025/0150009 A1* 5/2025 Hach ....................... H02J 1/106
2025/0388330 A1* 12/2025 Stepura .................. B64D 27/40
2026/0048748 A1* 2/2026 Grossmann ......... B60W 30/188
2026/0071561 A1* 3/2026 Sibbach ................... F01M 7/00
2026/0071575 A1* 3/2026 Sibbach .................. F01D 25/20
2026/0071576 A1* 3/2026 Sibbach ................. B64D 27/10
2026/0071580 A1* 3/2026 Sibbach ................. B64D 31/04

* cited by examiner

ENGINE POWERED CONTROL SYSTEM APPLIED TO UNMANNED VEHICLES

BACKGROUND OF THE INVENTION

(a) Field of the Invention

The present invention relates to innovation of an engine powered control system, and more particularly to an engine powered control system that can be applied to unmanned vehicles, wherein an engine start-up function and a power generation function are integrated in a single engine module, and uses a control module to achieve bidirectional rotation and intelligent start control logic.

(b) Description of the Prior Art

The unmanned vehicles we see today, such as Unmanned Aerial Vehicles (UAVs), Unmanned Ground Vehicles (UGVs), Unmanned Surface Vehicles (USVs), or Hybrid Powered Light Vehicles, all have extensive application in areas such as the military, agriculture, logistics, or energy exploration.

However, if the above-mentioned unmanned vehicles are mounted with an internal combustion engine (fuel engine) to serve as the core of a propulsion system or driving force, an additional electronic and electromechanical control system is often required to complete the start-up and stable power supply of the engine.

And in the design structure of unmanned vehicles of the prior art, the start-up and power supply of the engine can be generally respectively completed through two independent subsystems, such as the following:

1. Start-Up System:

The main application principle involves powering the system by a motor via batteries, then directly driving and rotating an engine crankshaft, thereby compressing a mixture of fuel and air, igniting thereof to start up the system. The motor only operates during the start-up phase, and as a result has a low usage rate, however, there are large demands on the amount of electric current required.

2. Power Generation System:

Such a system is usually an independent generator, and uses rotation of the engine to drive an internal magnetic field to generate voltage that supplies an electronic module (such as a flight control module, sensing, communication, or photography) inside the unmanned vehicle. The above-described system often requires an additional transmission mechanism and a voltage stabilization circuit.

Although some commercial power generation systems have already introduced Integrated Starter Generator (ISG) systems, but the design thereof still relies on a motor with high torque, which on the contrary increases the overall power consumption and weight.

Hence, existing technology still has the following many shortcomings:

1. The parts are disorganized and take up a lot of space: the motor and generator each have their own windings and structure, resulting in many and cluttered parts; moreover, the space required for both the motor and generator occupies a large percentage of the interior volume.
2. The control logic cannot be integrated: start-up and power generation are independent operations, making it difficult for the control system to integrate therewith, and requiring additional management of circuits and modules.

3. High power motors increase the energy consumption of the system: although some companies have initiated the practice of integrating start-up with power generation, it is still necessary to use a high-powered motor to drive forward rotation to start the high-compression ratio engine, which puts a burden on the batteries and causes heat dissipation difficulties.
4. High maintenance costs and complex wiring: the circuit and transmission system are dispersed inside multiple modules, and the complicated wiring results in frequent malfunction, requiring a large expenditure on maintenance costs.

In conclusion, although existing prior art design structures have complete functionality; however, there is still room for improvement with regard to size and percentage of space occupied, power consumption, integration ability, even control efficiency.

SUMMARY OF THE INVENTION

The main object of the present invention is to integrate an engine start-up function and a power generation into a single engine module, which uses a control module to achieve bidirectional rotation and intelligent start-up control logic that can be applied to an engine powered control system of unmanned vehicles.

In order to achieve the aforementioned object, the present invention has innovated an engine powered control system applied to unmanned vehicles, comprising: an engine module, a starter motor, a power output module, and a control module, wherein the engine module is provided with a power output terminal. The starter motor is configured to the power output terminal, and is further provided with a sensor that provides the starter motor with information on the rotor position thereof, to enable carrying out forward/reverse bidirectional rotation. The power output module is electrically connected to the starter motor, and as soon as the engine module starts, the electric energy generated by the starter motor is output to a flight control system or a power supply system of an unmanned vehicle. The control module is electrically connected to the starter motor, and is used to control the starter motor to carry out switching between drive, start-up, and power modes. Moreover, the control module is used to control the starter motor to carry out reverse rotation, causing backward displacement of the engine crankshaft of the engine module and conjunctively enabling release of compressed energy. The control module is then used to rotate the starter motor in a forward direction, and the inertia generated by compression rebound is used to function in coordination with the power of the starter motor, thereby completing the ignition start-up of the engine module. When the engine module is rotating at a preset rotation speed, an automatic switch-over to the start motor occurs, which enables a power generation mode, and a stable output voltage from the power output module supplies the flight control system or a power supply system of the unmanned vehicle.

Accordingly, the present invention uses the bidirectional rotation and position sensing capabilities provided by the starter motor in conjunction with the control module to carry out specific "first reverse, then forward" enable logic, which releases compression resistance of an internal combustion engine crankshaft and improves start-up efficiency. After starting the engine module, the system is switched to power generation mode to output stable power generated to a flight control system or the power supply system of an unmanned vehicle. In addition, the present invention provides excellent system integration that is small in size, and contributes to improving the endurance range of unmanned vehicles and the efficiency of system integration.

In conclusion, the present invention is clearly provided with at least the following functions and advantages with regard to technical concept and practical design:

1. Integrates Start-Up and Power Generation into a Single Motor Device:

A motor with forward and reverse rotation capability is used to enable achieving concurrent start-up and power generation functions, without the need to additionally install a generator or starter, thus clearly lightening the burden on the unmanned vehicle, as well as simplifying the modular design.

2. Uses "First Reverse, then Forward" Enable Logic, Effectively Reducing the Requirement of the Start-Up Torque:

By controlling the motor to first rotate in a reverse direction, the system of the present invention causes the engine crankshaft to displace backward, which enables release of compressed energy, and then switches to forward high-speed rotation to complete the start-up of the system. Such a mechanism enables a low-powered motor to start up an engine with a high-compression ratio, thereby substantially lowering the requirements on the size of the motor and battery output.

3. The System Automatically Switches Over to Power Generation Mode, Seamlessly Connecting System Operation:

The control module can monitor and control the rotational speed of the engine in real time, hence, when the engine is running and has stabilized, the system automatically controls and switches the motor into a synchronized power generation mode, which stabilizes the power supply to the power output module without the need for a mechanical clutch or switching device, thus achieving a simpler structure and superior operational efficiency.

4. a Sensor is Used to Assist in Feedback Control, Improving Control Precision and Stability:

A Hall sensor or an encoder is used to provide feedback on the angle of the motor rotor, and, functioning in coordination with a phase switch drive logic module, further achieves high-speed response, and improves start-up stability, as well as preventing idle running of the motor.

5. The Present Invention Uses System Modularization, which is Easy to Integrate and Maintain:

All core modules including the starter motor, the control module, and the power output module are designed as integrated modules, enabling quick disassembly and replacement thereof, and provides a compatible platform, which is suitable for unmanned vehicles or ground vehicles with different power ratings.

6. Improves Use Efficiency of Energy Resources, which Extends the Battery Life of Vehicles:

Because the overall power consumption of an unmanned vehicle power system is reduced, control efficiency is thereby correspondingly improved, and, functioning in combination with a small battery, enables completing multi-functional tasks, and contributes to extending the operation time and task range of unmanned vehicles.

In an embodiment of the engine powered control system applied to unmanned vehicles of the present invention as described above, an AC (alternating current) brushless motor is selected as the starter motor, and the starter motor is a three-phase permanent magnet synchronous motor, the stator of which comprises a three-phase winding, and an electronic drive is used to control phase switching.

In the embodiment of the engine powered control system applied to unmanned vehicles of the present invention as described above, a rotor position sensor is selected as the sensor, which is used to feed back the angular position of the starter motor to the control module, whereby phase switching accuracy and start-up stability is increased.

In the embodiment of the engine powered control system applied to unmanned vehicles of the present invention as described above, the sensor is selected from any one of the following: a Hall effect sensor, which is configured in the interior of the starter motor, and detects the magnetic field polarity of the rotor; or a rotary encoder, which is configured to the shaft end of the starter motor, and is used to supply absolute or relative position signals.

In the embodiment of the engine powered control system applied to unmanned vehicles of the present invention as described above, the control module comprises a reverse start control module, which is used to set the reverse rotation angle or reverse rotation time of the starter motor; a forward start control module, which is used to output a forward acceleration control signal; a power generation switching module, which is used to automatically switch the operation mode of the starter motor to power generation mode when the rotational speed of the engine module exceeds the preset threshold value; and a phase switch drive logic module, which is used to determine power-on phase and phase switch time according to input from the sensor.

In the embodiment of the engine powered control system applied to unmanned vehicles of the present invention as described above, settable parameters of the reverse start control module and the forward start control module include reverse rotation angle or maximum reverse rotational speed, forward rotation acceleration, forward rotation duration, power generation switching rotational speed threshold value, and restart fault tolerance judgment condition.

In the embodiment of the engine powered control system applied to unmanned vehicles of the present invention as described above, the starter motor is switched to synchronous generator operation through the control module. In addition, the power output module is provided with a rectifying unit, which is used to convert three phase AC to DC (direct current); a voltage-stabilizing unit, which is used to maintain output voltage within a set range; and a protection module, which is used to prevent overcurrent, overvoltage, or short circuiting. Further, the output voltage range from the power output module includes but is not limited to DC 12V, DC 24V, and DC 48V, and supports automatic switching of output frequency modulation through a switching regulator.

In the embodiment of the engine powered control system applied to unmanned vehicles of the present invention as described above, the starter motor, the control module, and the power output module are designed with modularization, and are installed in a shared mechanism housing, thereby enabling quick disassembly.

In the embodiment of the engine powered control system applied to unmanned vehicles of the present invention as described above, the unmanned vehicle is selected from any one of the following: an Unmanned Aerial Vehicle (UAV), an Electric Vertical Takeoff and Landing (eVTOL) vehicle, an Unmanned Ground Vehicle (UGV), an Unmanned Surface Vehicle (USV), or a Hybrid Powered Light Vehicle.

To enable a further understanding of said objectives, structures, characteristics, and effects, as well as the technology and methods used in the present invention and effects achieved, a brief description of the drawings is provided below followed by a detailed description of the preferred embodiments.

DETAILED DESCRIPTION OF THE PREFERRED EMBODIMENTS

Referring to FIGS. 1, 2, 3A, 3B, and 3C, which show respectively a three-dimensional schematic view of the present invention, a block schematic view of the structure of the present invention, a schematic view of a starter motor of the present invention applied before rotating, a schematic view of the starter motor of the present invention applied during reverse rotation, and a schematic view of the starter motor of the present invention applied during forward rotation.

Figure 1:
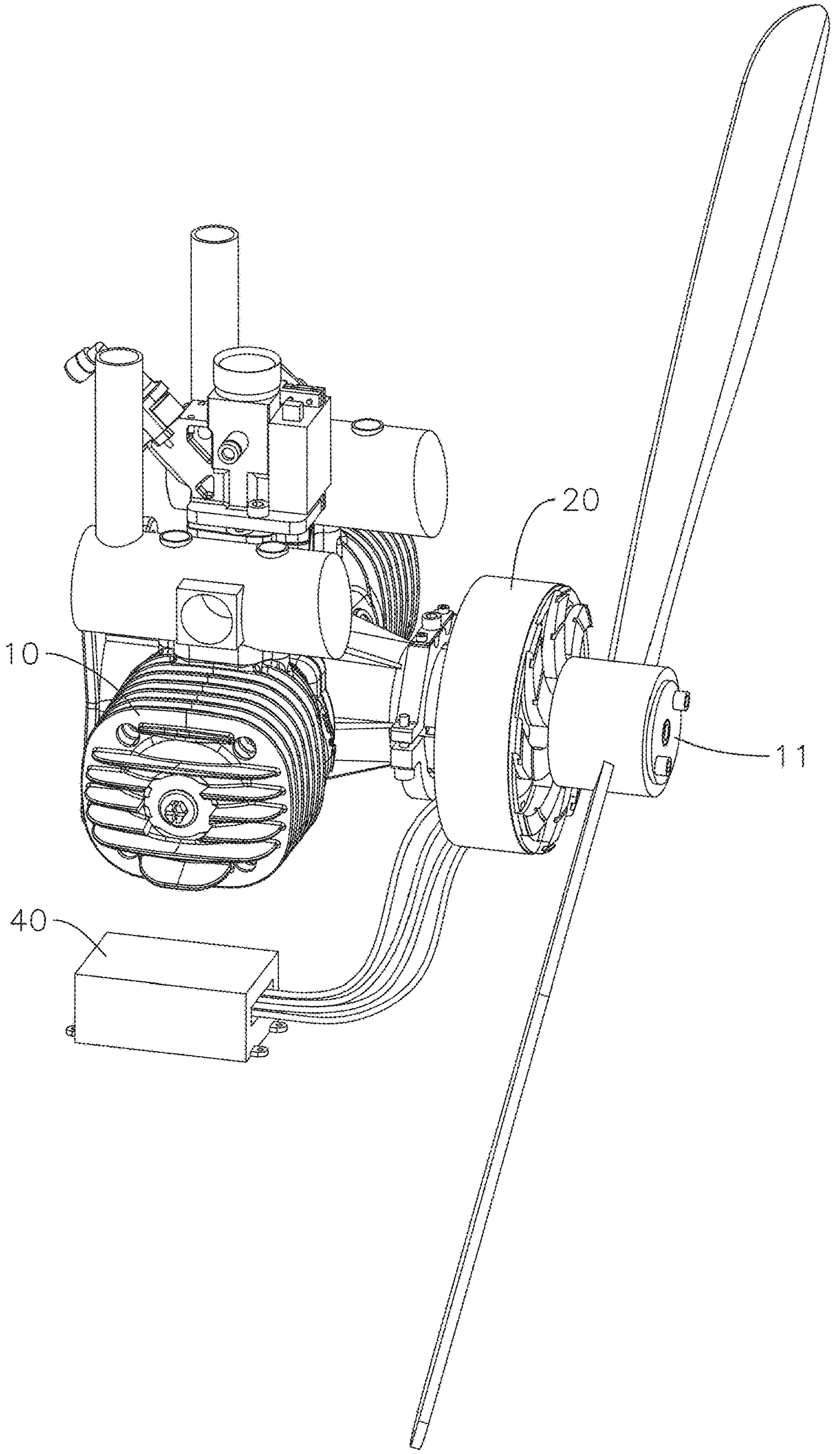
FIG. 1 is a three-dimensional schematic view of the present invention.
Figure 2:
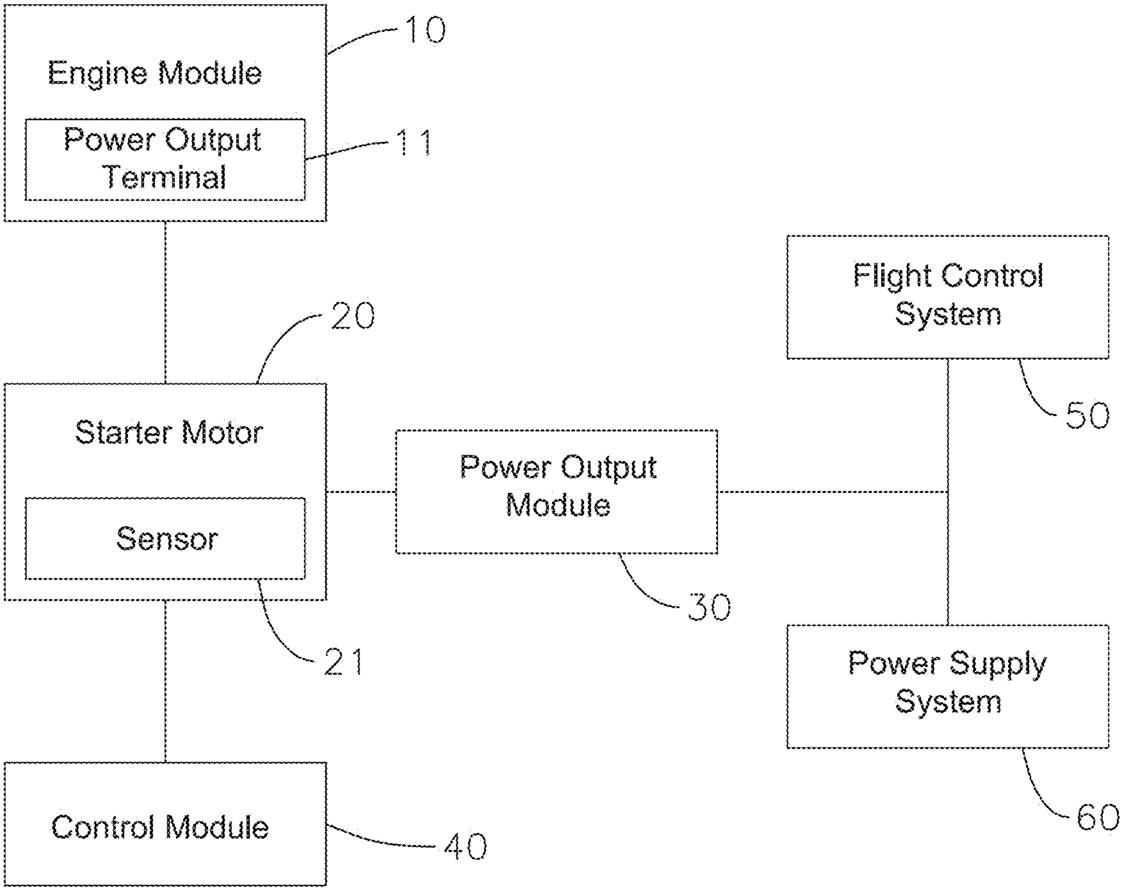
FIG. 2 is a block schematic view of the structure of the present invention.

Referring to FIG. 1 and FIG. 2, which disclose an engine powered control system of the present invention having application in unmanned vehicles, wherein the engine powered control system comprises at least an engine module 10, a starter motor 20, a power output module 30, and a control module 40.

The engine module 10 is provided with a power output terminal 11.

The starter motor 20 is configured to the power output terminal 11, and the starter motor 20 is further provided with a sensor 21, which provides the starter motor 20 with information on the rotor position thereof. The starter motor 20 further enables carrying out forward/reverse bidirectional rotation.

The power output module 30 is electrically connected to the starter motor 20, and is on standby until the engine module 10 starts up, whereupon the electric energy generated by the starter motor 20 is output to a flight control system 50 or a power supply system 60 of the unmanned vehicle.

The control module 40 is electrically connected to the starter motor 20, and is used to control the starter motor 20 to carry out switching between drive, start, and power modes.

The control module 40 controls the starter motor 20 to carry out reverse rotation, which causes backward displacement of an engine crankshaft of the engine module 10 and conjunctively enables release of compressed energy.

Then the control module 40 is used to drive and rotate the starter motor 20 at high speed rotation in a forward direction, whereby the inertia generated by compression rebound functions in coordination with the power of the starter motor 20 to complete ignition start-up of the engine module 10.

When the engine module 10 is rotating at a preset rotation speed, then an automatic switch-over to the start motor 20 occurs, enabling a power generation mode, and a stable output voltage from the power output module 30 supplies the flight control system 50 or the power supply system 60 of the unmanned vehicle.

In an embodiment of the present invention, an AC (alternating current) brushless motor is selected as the starter motor 20, and the starter motor 20 is a three-phase permanent magnet synchronous motor, the stator of which comprises a three-phase winding, and an electronic drive is used to control phase switching.

In the embodiment of the present invention, a rotor position sensor is selected as the sensor 21, which is used to feed back the angular position of the starter motor 20 to the control module 40, whereby phase switching accuracy and start-up stability is increased.

In the embodiment of the present invention, the sensor 21 is selected from any one of the following: a Hall effect sensor, which is configured in the interior of the starter motor 20, and detects the magnetic field polarity of the rotor; or a rotary encoder, which is configured to the shaft end of the starter motor 20, and is used to supply absolute or relative position signals.

In the embodiment of the present invention, the control module 40 comprises a reverse start control module, which is used to set the reverse rotation angle or reverse rotation time of the starter motor 20; a forward start control module, which is used to output a forward acceleration control signal; a power generation switching module, which is used to automatically switch the operation mode of the starter motor 20 to power generation mode when the rotational speed of the engine module 10 exceeds a preset threshold value; and a phase switch drive logic module, which is used to determine power-on phase and phase switch time according to input from the sensor 21.

In the embodiment of the present invention, settable parameters of the reverse start control module and the forward start control module include reverse rotation angle or maximum reverse rotational speed, forward rotation acceleration, forward rotation duration, power generation switching rotational speed threshold value, and restart fault tolerance judgment condition.

In the embodiment of the present invention, the starter motor 20 is switched to synchronous generator operation through the control module 40. In addition, the power output module 30 is provided with a rectifying unit, which is used to convert three phase AC to DC (direct current); a voltage-stabilizing unit, which is used to maintain output voltage within a set range; and a protection module, which is used to prevent overcurrent, overvoltage, or short circuiting. Further, the output voltage range from the power output module 30 includes but is not limited to DC 12V. DC 24V and DC 48V, and supports automatic switching of output frequency modulation through a switching regulator. In the embodiment of the present invention, the starter motor 20, the control module 40 and the power output module 30 are designed with modularization, and are installed in a shared mechanism housing, thereby enabling quick disassembly.

In the embodiment of the present invention, the unmanned vehicle is selected from any one of the following: an Unmanned Aerial Vehicle (UAV), an Electric Vertical Takeoff and Landing (eVTOL) vehicle, an Unmanned Ground Vehicle (UGV), an Unmanned Surface Vehicle (USV), or a Hybrid Powered Light Vehicle.

Figure 3A:
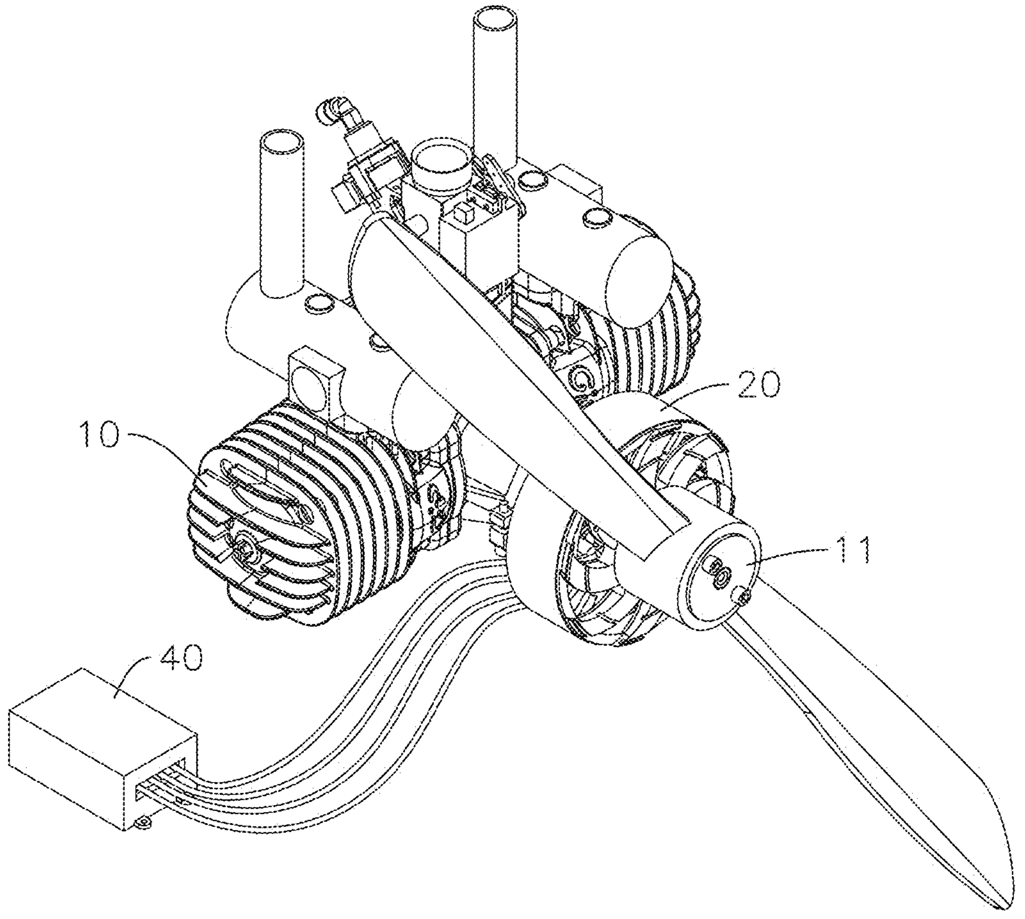
FIG. 3A is a schematic view of a starter motor of the present invention applied before rotating.

Referring to FIG. 3A, when the present invention is in a normal state and not in use, and the control module 40 is unable to control the starter motor 20 to carry out reverse rotation, i.e., the starter motor 20 is not yet driving the power output terminal 11 of the engine module 10, meaning the power output terminal 11 maintains an immobile state.

Figure 3B:
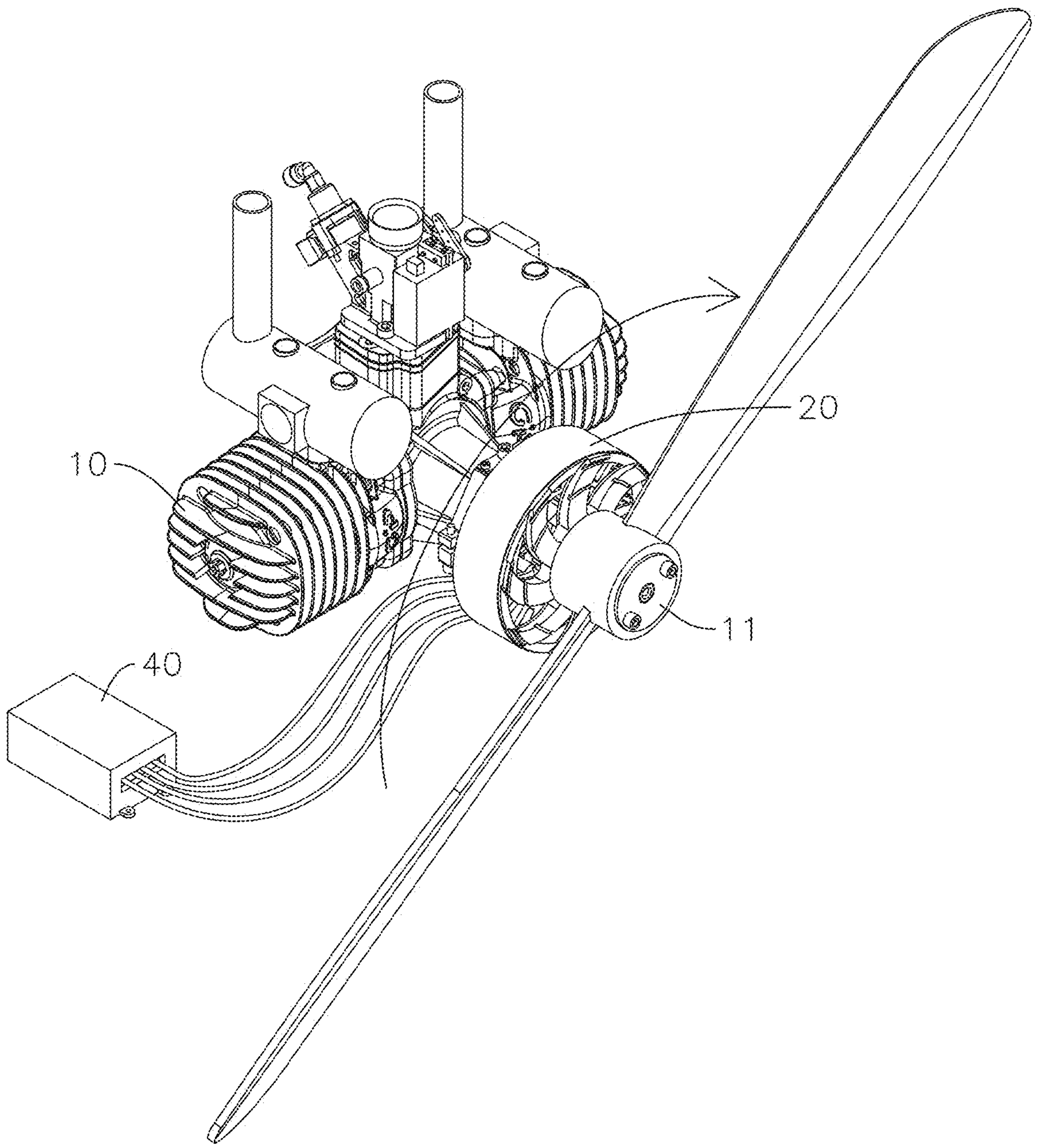
FIG. 3B is a schematic view of the starter motor of the present invention applied during reverse rotation.

Referring to FIG. 3B, after starting the unmanned vehicle, the control module 40 is used to control the starter motor 20 to carry out reverse rotation, the starter motor 20 then drives synchronous reverse rotation of the power output terminal 11 of the engine module 10, causing backward displacement of the engine crankshaft of the engine module 10, and conjunctively enabling release of compressed energy.

Figure 3C:
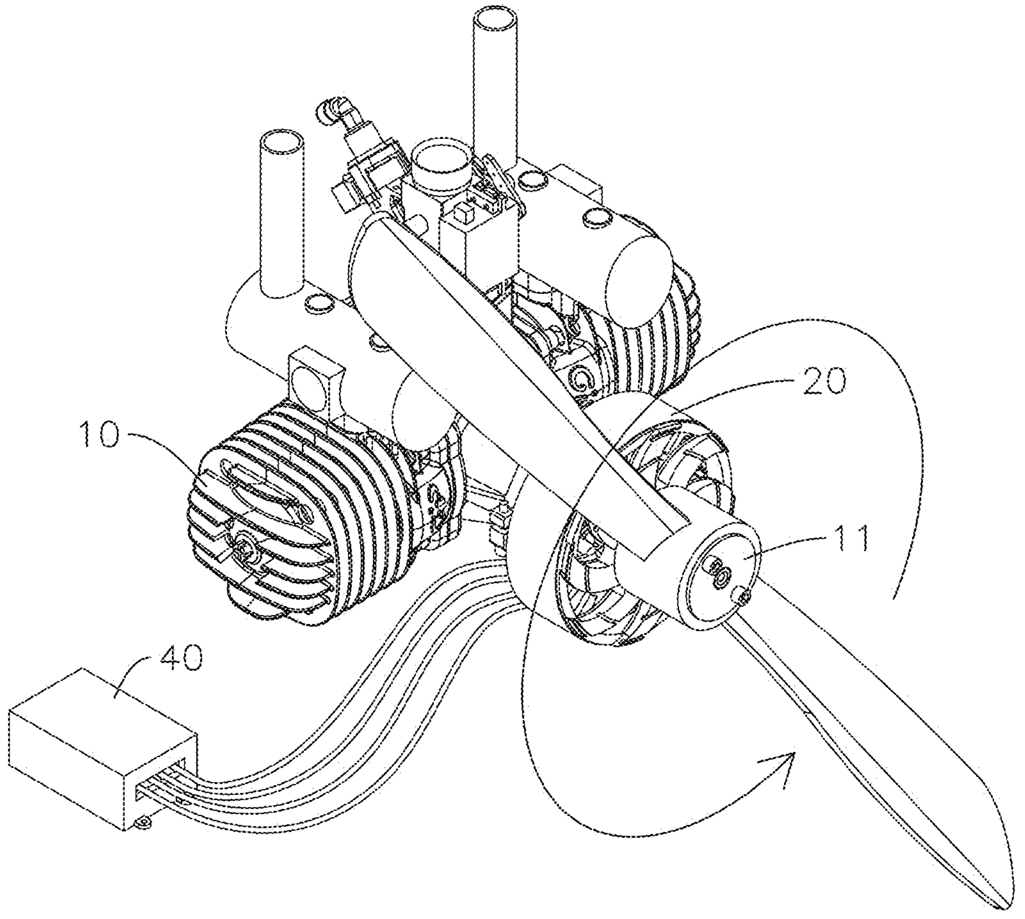
FIG. 3C is a schematic view of the starter motor of the present invention applied during forward rotation.

Referring to FIG. 3C, activation of the control module 40 is then used to drive the starter motor 20 at high speed rotation in a forward direction, whereupon the starter motor 20 drives the power output terminal 11 of the engine module 10 in synchronous rotation in a forward direction; moreover, the inertia generated by compression rebound is used to function in coordination with the power of the starter motor 20 to complete the ignition start-up of the engine module 10.

When the engine module 10 is rotating at a preset rotation speed, then an automatic switch-over to the starter motor 20 occurs, enabling the power generation mode, whereby a stable output voltage from the power output module 30 supplies the flight control system 50 or the power supply system 60 of an unmanned vehicle.

Accordingly, the present invention uses the bidirectional rotation and position sensing capabilities of the starter motor 20 in conjunction with the control module 40 to carry out specific "first reverse, then forward" enable logic, to release compression resistance of an internal combustion engine crankshaft and improve start-up efficiency. The system is switched to power generation mode after starting the engine module 10, to output the stable power generated to the flight control system 50 or the power supply system 60 of an unmanned vehicle.

In addition, the present invention provides excellent system integration that is small in size, and contributes to improving the endurance range of unmanned vehicles and the efficiency of system integration.

To sum up, the technical concept and practical design of the present invention provides at least the following functions and advantages:

1. Integrates Start-Up and Power Generation into a Single Motor Device:

A motor with forward and reverse rotation capability is used to enable achieving concurrent start-up and power generation functions, without the need to additionally install a generator or starter, thus clearly lightening the burden on the unmanned vehicle, as well as simplifying the modular design.

2. Uses "First Reverse, then Forward" Enable Logic, Effectively Reducing the Requirement of the Start-Up Torque:

The system of the present invention controls the motor to first rotate in a reverse direction, causing the engine crankshaft to displace backward, which enables the release of compressed energy, and then switches to forward high-speed rotation to complete the start-up of the system. Such a mechanism enables a low-powered motor to start up an engine with a high-compression ratio, substantially reducing the requirements on the size of the motor and battery output.

3. After the Rotational Speed of the Engine Reaches a Preset Rotation Speed, the Starter Motor Automatically Switches Over to Power Generation Mode, Seamlessly Connecting System Operation:

The control module can monitor and control the rotational speed of the engine in real time. When the engine is running and has stabilized, the system automatically controls and switches the motor into a synchronized power generation mode, providing the power output module with a stable voltage supply, without the need for a mechanical clutch or switching device, thus achieving a simpler structure and superior operational efficiency.

4. a Sensor is Used to Assist in Feedback Control, Improving Control Precision and Stability:

A Hall sensor or an encoder is used to provide feedback on the angle of the motor rotor, and, functioning in coordination with a phase switch drive logic module, further achieves high-speed response, improves start-up stability, and prevents idle running of the motor.

5. The Present Invention Uses System Modularization, which is Easy to Integrate and Maintain:

All core modules including the starter motor 20, the control module 40, and the power output module 30 are designed as integrated modules, enabling quick disassembly and replacement thereof, and provides a compatible platform that is suitable for unmanned vehicles or ground vehicles with different power ratings.

6. Improves Use Efficiency of Energy Resources, Thereby Extending the Battery Life of Unmanned Vehicles:

Because the overall power consumption of an unmanned vehicle power system is reduced, control efficiency is thereby correspondingly improved, and, functioning in combination with a small battery, enables completing multi-functional tasks, and contributes to extending the operation time and task range of unmanned vehicles.

In conclusion, the present invention clearly achieves effective improvements on the shortcomings of prior art technology, whereby the bidirectional rotation and position sensing capabilities of the starter motor is used in conjunction with the control module to carry out specific "first reverse, then forward" enable logic, to release compression resistance of an internal combustion engine crankshaft and improve start-up efficiency. The system is switched to power generation mode after starting the engine module, and the stable power generated is output to a flight control system or to a power supply system of an unmanned vehicle, thereby providing the present invention with excellent system integration that is small in size, and contributes to improving the endurance range of unmanned vehicles and the efficiency of system integration. Without doubt, the present invention is more advanced and practical, which meets the respective requirements of both manufacturers and users, and clearly complies with the essential elements as required for a new patent application.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. An engine powered control system applied to unmanned vehicles, comprising:

an engine module, which is provided with a power output terminal;

a starter motor, which is configured to the power output terminal, and the starter motor is further provided with a sensor, which provides the starter motor with information on a rotor position thereof, and also enables carrying out forward or reverse bidirectional rotation;

a power output module, which is electrically connected to the starter motor, and is in standby until the engine module starts up, whereupon an electric energy generated by the starter motor is output to a flight control system or a power supply system of an unmanned vehicle; and a control module, which is electrically connected to the starter motor, and is used to control the starter motor to carry out switching between drive, start, and power modes; wherein the control module is used to control the starter motor to carry out reverse rotation, causing backward displacement of an engine crankshaft of the engine module and conjunctively enabling release of compressed energy, wherein the control module comprises a reverse start control module, which is used to set a reverse rotation angle of the starter motor or reverse rotation duration; a forward start control module, which is used to output a forward acceleration control signal; a power generation switching module, which is used to automatically switch an operation mode of the starter motor to power generation mode when the rotational speed of the engine module exceeds a preset threshold value; and a phase switch drive logic module, which is used to determine power-on phase and phase transition time according to input from the sensor;

activation of the control module is then used to drive the starter motor at high speed rotation in a forward direction, and uses an inertia generated by compression rebound functioning in coordination with power of the starter motor to complete ignition start-up of the engine module;

after rotational speed of the engine module reaches a preset rotation speed, then the starter motor is automatically switched to a power generation mode, and a stable output voltage from the power output module supplies flight control system or power supply system of the unmanned vehicle.

2. The engine powered control system applied to unmanned vehicles according to claim 1, wherein an AC (alternating current) brushless motor is selected as the starter motor, and the starter motor is a three-phase permanent magnet synchronous motor, a stator of which comprises a three-phase winding, and an electronic drive is used to control phase switching.

3. The engine powered control system applied to unmanned vehicles according to claim 1, wherein a rotor position sensor is selected as sensor, which is used to feed back an angular position of the starter motor to the control module, whereby phase switching accuracy and start-up stability is increased.

4. The engine powered control system applied to unmanned vehicles according to claim 1, wherein the sensor is selected from any one of the following: a Hall effect sensor, which is configured in an interior of the starter motor, and detects a magnetic field polarity of the rotor; or a rotary encoder, which is configured to a shaft end of the starter motor, and is used to supply absolute or relative position signals.

5. The engine powered control system applied to unmanned vehicles according to claim 1, wherein settable parameters of a reverse start control module and the forward direction start control module include the reverse rotation angle or maximum reverse rotational speed, forward rotation acceleration, forward rotation duration, power generation switching rotational speed threshold value, and restart fault tolerance judgment condition.

6. The engine powered control system applied to unmanned vehicles according to claim 1, wherein the starter motor is switched to synchronous generator operation by means of the control module, and the power output module is provided with a rectifying unit, which is used to convert a three phase AC to DC (direct current); a voltage-stabilizing unit, which is used to maintain output voltage within a set range; and a protection module, which is used to prevent overcurrent, overpressure, or short circuiting; wherein the output voltage range from the power output module includes but is not limited to DC 12V DC 24V and DC 48V, and be able to support automatic switching of output frequency modulation through a switching regulator.

7. The engine powered control system applied to unmanned vehicles according to claim 1, wherein the starter motor, the control module, and the power output module are designed with modularization, and are installed in a shared mechanism housing, thereby enabling quick disassembly.

8. The engine powered control system applied to unmanned vehicles according to claim 1, wherein the unmanned vehicle is selected from any one of the following: an Unmanned Aerial Vehicle, an Electric Vertical Takeoff and Landing, an Unmanned Ground Vehicle, an Unmanned Surface Vehicle, or a Hybrid Powered Light Vehicle.

* * * * *